March 24, 1936. T. C. SACKETT 2,034,880

HEATED WINDSHIELD WIPER

Original Filed Nov. 16, 1933

Inventor
T. C. SACKETT
By Chas. C. Reif
Attorney

Patented Mar. 24, 1936

2,034,880

UNITED STATES PATENT OFFICE 2,034,880

HEATED WINDSHIELD WIPER

Thomas C. Sackett, Stuart, Iowa

Application November 16, 1933, Serial No. 698,245
Renewed August 12, 1935

3 Claims. (Cl. 15—250)

This invention relates to a windshield wiper for the windshield of an automobile or other vehicle, and particularly to a windshield wiper which is heated.

It is well known to drivers of automobiles that in the cold seasons frost often collects on the windshield, seriously interfering with the vision and rendering driving very hazardous. When the temperature is near freezing a light rain or sometimes snow strikes the windshield and freezes thereon instantly and the windshield is soon covered with ice or snow so that vision therethrough is prevented.

It is an object of this invention to provide a simple, inexpensive and efficient windshield wiper which will keep the windshield clear so that a perfect vision can be had therethrough.

It is a further object of the invention to provide such a windshield wiper comprising an elongated hollow casing with suitable means closing its ends, a wiper blade carried by said casing, heating means in said casing and means for supporting said wiper at the outer side of the windshield.

It is another object of the invention to provide a windshield wiper comprising an elongated casing of sheet metal, insulating blocks at the ends of said casing closing the same, a wiper blade secured in said casing, heating elements extending in said casing between said blocks and secured thereto and means for conducting current to said heating elements.

It is more specifically an object of the invention to provide a windshield wiper comprising a casing made of a substantially rectangular piece of sheet metal, the same being formed to substantially elliptical shape to provide an elongated casing, the edge portions of said sheet being bent inwardly of said casing in substantially parallel relation, a flexible resilient wiper blade held between said edge portions, insulating blocks closing the ends of said casing, heating elements extending longitudinally of said casing at either side thereof between said blocks and a cord for conducting current to said elements.

These and other objects and advantages of the invention will be fully set forth in the following description made in connection with the accompanying drawing, in which like reference characters refer to similar parts throughout the several views and in which:—

Figure 1:
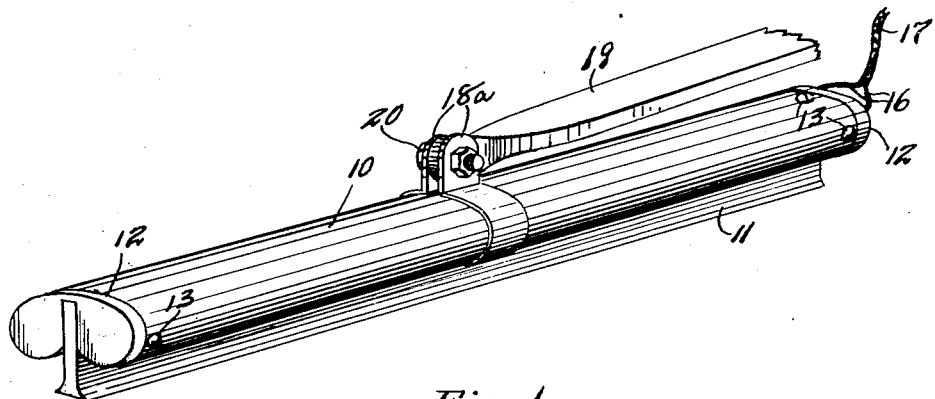
Fig. 1 is a perspective view of said wiper.
Figure 2:
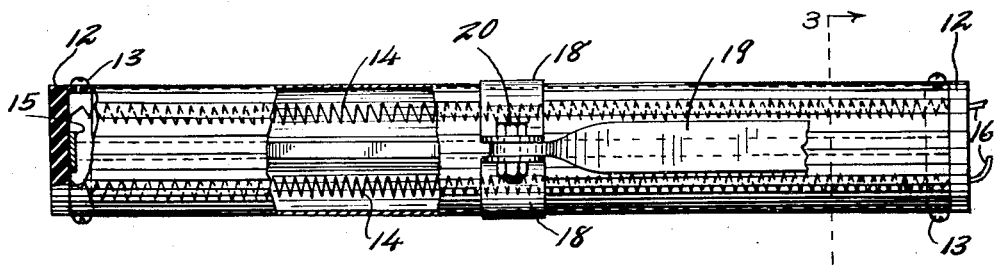
Fig. 2 is a top plan view thereof, some parts being broken away and others being shown in horizontal section.
Figure 3:
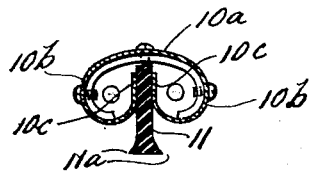
Fig. 3 is a vertical section taken on line 3—3 of Fig. 2.

Referring to the drawing, a windshield wiper is shown comprising an elongated hollow casing 10. While this casing may be variously formed, in the embodiment of the invention illustrated, it is shown as formed of a piece of sheet material such as sheet metal. Said piece of sheet metal is of substantially rectangular form, the same being bent into substantially elliptical shape to have the top concave side 10a and the concave side portions 10b. The edge portions 10c of said sheet are bent inwardly in substantially parallel relation centrally of said casing and a wiper blade 11 which will be flexible and resilient and preferably made of rubber or similar material is secured between edge portions 10c. Blade 11 can be clamped in position or it may also be secured to edge portions 10c by suitable adhesive. Said blade is substantially rectangular in cross section and projects at one side of casing 10, its outer edge being of increased width to form corners 11a of angles less than a right angle. Blocks 12 of insulating material, such as some rubber composition and in the form of discs, are disposed at each end of casing 10, said blocks closing the ends of said casing. Said blocks 12 have flanges extending a short distance inwardly of casing 10 and said casing is secured to said flanges in any suitable manner. In the embodiment of the invention illustrated said blocks are shown secured to casing 10 by the screws 13. An electrical heating element 14 is provided and the same consists of two portions or elements of heating material or wire illustrated as in the form of helices extending between blocks 12 in either side of casing 10 and between the outer walls thereof and the inturned portions 10c. The portions of heating element 14 are connected at one end to said casing and held to one disc 12 by the clamping member 15 secured in any suitable manner to said block 12. At the other end of said casing said heating elements are secured to and extend through the block 12 and have connected thereto electrical conductors 16 which will conveniently be enclosed in the cord 17 which will extend to a suitable source of current. Clamp members 18 are secured to casing 10 at the central portion thereof, said members being formed of narrow strips of sheet metal which will be secured to said casing by welding, soldering or other suitable means. Portions 18 are bent to extend upwardly from the top of casing 10 forming parallel lugs 18a, between which extends the flattened end of a supporting arm 19. Said end and lugs 18a are apertured to receive a headed and nutted clamping bolt 20 extending therethrough and securing the wiper to arm 19. The arm 19 is connected to some suitable actuating means which oscillates the wiper over the windshield in a manner well known and now common in the art. In practice the casing 10 will be suitably coated with some weather-resisting coating which may also be applied to portions 12 and 18. This coating will be such as to give the wiper a pleasing and ornamental appearance.

In operation the wiper will be disposed at the outer side of the windshield and supported by the arm 19 which depends from the operating mechanism which is usually located at the top of the windshield. The conductors 16 in cord 17 will be connected to the battery of the automobile which is now a standard part thereof. Current will be supplied to conductors 14 and a suitable switch (not shown) will be provided to turn the current on and off, which switch will be disposed in position for convenient manipulation by the driver. When current is supplied to the heating element 14, the casing 10 will be heated and this heat will be radiated to the glass of the windshield. The motion of the car will tend to cause the air to carry the heat toward the windshield. The windshield and the layer of air adjacent the same will be sufficiently heated to melt any frost, ice or snow which may tend to form thereon and the windshield will be kept in clean and clear condition by the wiper blade 11. The heating element consumes very little electrical power and ample current can be supplied by the ordinary battery without unduly discharging the battery. The casing 10 with block 12 forms a waterproof structure.

The wiper can be connected to any of the various operating arms already provided on automobiles and it will only take a few minutes to substitute the present windshield wiper for the ones now employed. The wiper can, of course, also be installed as new equipment.

From the above description it will be seen that applicant has provided a very simple and efficient windshield wiper and one which will have a high degree of utility in weather where frost, ice or snow tends to collect on the windshield. The device is quite simple in construction and can be made and sold at a very reasonable price. The device has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth in the parts and combinations of parts disclosed and defined in the appended claims.

What is claimed is:—

1. A windshield wiper comprising an elongated casing of sheet metal, said casing comprising a substantially rectangular piece of sheet metal bent into elliptical form and having its free side edges bent to extend inwardly in parallel relation centrally of said casing, a flexible and resilient wiper blade held between said edge portions, heating elements extending longitudinally of said casing at each side of said blade and edge portions and a conductor cord for conducting current to said elements.

2. A windshield wiper comprising an elongated casing formed from a piece of substantially rectangular sheet metal bent to form a hollow tube, the edge portions of the free sides of said sheet re-entrantly bent to extend in parallel relation, a flexible wiper blade held between said edge portions and substantially dividing said casing into two compartments, members closing the ends of said casing, a heating element extending longitudinally in each compartment and means for conducting current to said elements.

3. A windshield wiper comprising a sheet of material of substantial rectangular form having its opposite sides bent into tubular form to form a casing the free edge portions of said sheet extending in parallel relation toward the closed side of said casing, a wiper blade held between said portions and projecting therefrom, means for supporting said casing with said wiper blade engaging the windshield, heating elements disposed in said casing and extending longitudinally therein at each side of said blade and means for supplying current to said heating elements.

THOMAS C. SACKETT.